United States Patent [19]
Taniguchi et al.

[11] Patent Number: 5,715,990
[45] Date of Patent: Feb. 10, 1998

[54] REFLOW APPARATUS AND METHOD

[75] Inventors: Masahiro Taniguchi, Hirakata; Youichi Nakamura; Kazumi Ishimoto, both of Katano; Kimihito Kuwabara, Kadoma; Toshinori Mimura; Kurayasu Hamasaki, both of Moriguchi; Kenichi Nakano, Neyagawa; Manabu Ando, Yawata, all of Japan

[73] Assignee: Matsushita Electric Industrial Co., Ltd., Kadoma, Japan

[21] Appl. No.: 601,590

[22] Filed: Feb. 14, 1996

Related U.S. Application Data

[62] Division of Ser. No. 442,886, May 17, 1995, Pat. No. 5,524,812, which is a division of Ser. No. 152,143, Nov. 16, 1993, Pat. No. 5,472,135.

[30] Foreign Application Priority Data

| Nov. 17, 1992 | [JP] | Japan | 4-306824 |
| Nov. 17, 1992 | [JP] | Japan | 4-306825 |
| Nov. 17, 1992 | [JP] | Japan | 4-306826 |

[51] Int. Cl.⁶ ............................. B23K 1/012
[52] U.S. Cl. ........................ 228/234.1; 228/42
[58] Field of Search ................... 432/148, 194; 228/42, 134.1 A

[56] References Cited

U.S. PATENT DOCUMENTS

| 4,909,430 | 3/1990 | Yokota. | |
| 5,069,380 | 12/1991 | Deambrosio | 228/42 |
| 5,141,147 | 8/1992 | Yokota | 228/219 |
| 5,145,100 | 9/1992 | Kondo | 228/42 |
| 5,147,083 | 9/1992 | Halstead et al. | |
| 5,195,674 | 3/1993 | Nishi | 228/42 |
| 5,356,066 | 10/1994 | Yamada | 228/42 X |

FOREIGN PATENT DOCUMENTS

| 62-151268 | 7/1987 | Japan. |
| 63-177960 | 7/1988 | Japan. |
| 2-137691 | 5/1990 | Japan. |
| 4-253566 | 9/1992 | Japan. |
| 4-274867 | 9/1992 | Japan. |
| 5-50217 | 3/1993 | Japan. |

OTHER PUBLICATIONS

Patent Abstract of Japan, vol. 017, No. 031 (M-1356), 21 Jan. 1993 & JP-A-04 253566 (Tamura Seisakusho Co., Ltd.), 9 Sep. 1992.

Patent Abstract of Japan, vol. 011, No. 380 (M-650), 11 Dec. 1987 & JP-A-62 141268 (Tamura Seisakusho Co., Ltd.), 6 Jul. 1987.

Patent Abstract of Japan, vol. 017, No. 068 (M-1365), 10 Feb. 1993 & JP-A-04 274867 (Matsushita Electric Ind. Co.), 30 Sep. 1992.

Patent Abstract of Japan, vol. 017, No.350 (M-1438), 2 Jul. 1993 & JP-A-05 050217 (Tamura Seisakusho Co., Ltd.), 2 Mar. 1993.

*Primary Examiner*—Kenneth J. Ramsey
*Attorney, Agent, or Firm*—Wenderoth, Lind & Ponack

[57] ABSTRACT

The present invention provides a reflow apparatus and method effective to make constant the internal gas flow direction in a heating section within a reflow furnace. A circulating gas path is formed in a heating unit which collects and causes the gas to flow from a sirocco fan, up the rear side of the heating unit and then down towards a circuit board moving along a transfer path at the front side of the heating unit. Moreover, a plurality of straightening plates are arranged above the transfer path of the heating unit so as to guide the hot gas, which is flowing forwardly downwardly toward the circuit board moving along the transfer path. A blow-down nozzle is provided and includes a plurality of plates aligned in rows in the transferring direction of the circuit boards. The plates have an inverse U-shaped cross section. The blow-down nozzle is arranged below the straightening plates to cause the vertical hot gas flows to flow uniformly over the whole surface of the circuit board.

13 Claims, 17 Drawing Sheets

REFLOW APPARATUS AND METHOD

This is a divisional application of Ser. No. 08/442,886, filed May 17, 1995, now U.S. Pat. No. 5,524,812 which is a divisional application of Ser. No. 08/152,143, filed Nov. 16, 1993 (now U.S. Pat. No. 5,472,135).

BACKGROUND OF THE INVENTION

The present invention relates to a reflow apparatus and method which jets out hot gas flow to a circuit board to thereby solder the circuit board while transferring the circuit board into a plurality of sections in a reflow furnace along a transfer path.

A conventional reflow apparatus of the type referred to above is disclosed, for example, in Japanese Patent Laid-open Publication No. 2-137691(137691/1990) wherein a circuit board is heated in the gas and soldered while being transferred in a plurality of sections within a reflow furnace along a transfer path.

In the reflow apparatus of this kind, as shown in FIG. 25, a cream solder is fed to a circuit board 61 beforehand. After the circuit board 61 is moved into a reflow furnace 63 via an entrance along a transfer path 62, the circuit board 61 is moved through a first preheating section 64, a second preheating section 65, a reflow section 66 and a cooling section 69 along the transfer path. The circuit board 61 is gradually heated in the first and second preheating sections 64, 65, and is then further heated in the reflow section 66 to thereby be soldered. Reference numerals 67 indicate heaters arranged at predetermined intervals immediately above the transfer path 62 in each of the first preheating section 64, second preheating section 65 and reflow section 66.

In the above-described conventional reflow apparatus, since the heaters 67 are located close to the transfer path 62, a heated gas flow 70 which passes through the vicinity of the heaters 67 and a non-heated gas flow 71 which passes between the heaters 67 are not mixed with each other. The circuit board 61 on the transfer path 62 is eventually hit by the gas flows 70, 71 having differing temperatures and velocities, thus failing to satisfy the reflow condition.

An object of the present invention is to provide a reflow apparatus and method which can send gas flows of uniform temperature and uniform velocity to a circuit board moving along a transfer path.

SUMMARY OF THE INVENTION

In accomplishing these and other objects, according to one aspect of the present invention, there is provided a reflow apparatus in which hot gas flow is fed to a circuit board to solder the circuit board while the circuit board to which a cream solder has been supplied beforehand is carried into a plurality of sections within a reflow furnace along a transfer path. The reflow apparatus includes a heating section which comprises: a fan for causing the gas to flow; a heating device for heating gas sent out from the fan, the heating device arranged at one side of the transfer path; and a circulating gas path for collecting and raising the gas flow sent out from the fan to the heating device and causing the raised gas flow to drop down towards the circuit board on the transfer path from an upper side of the heating section.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE EMBODIMENTS

Figure 1:
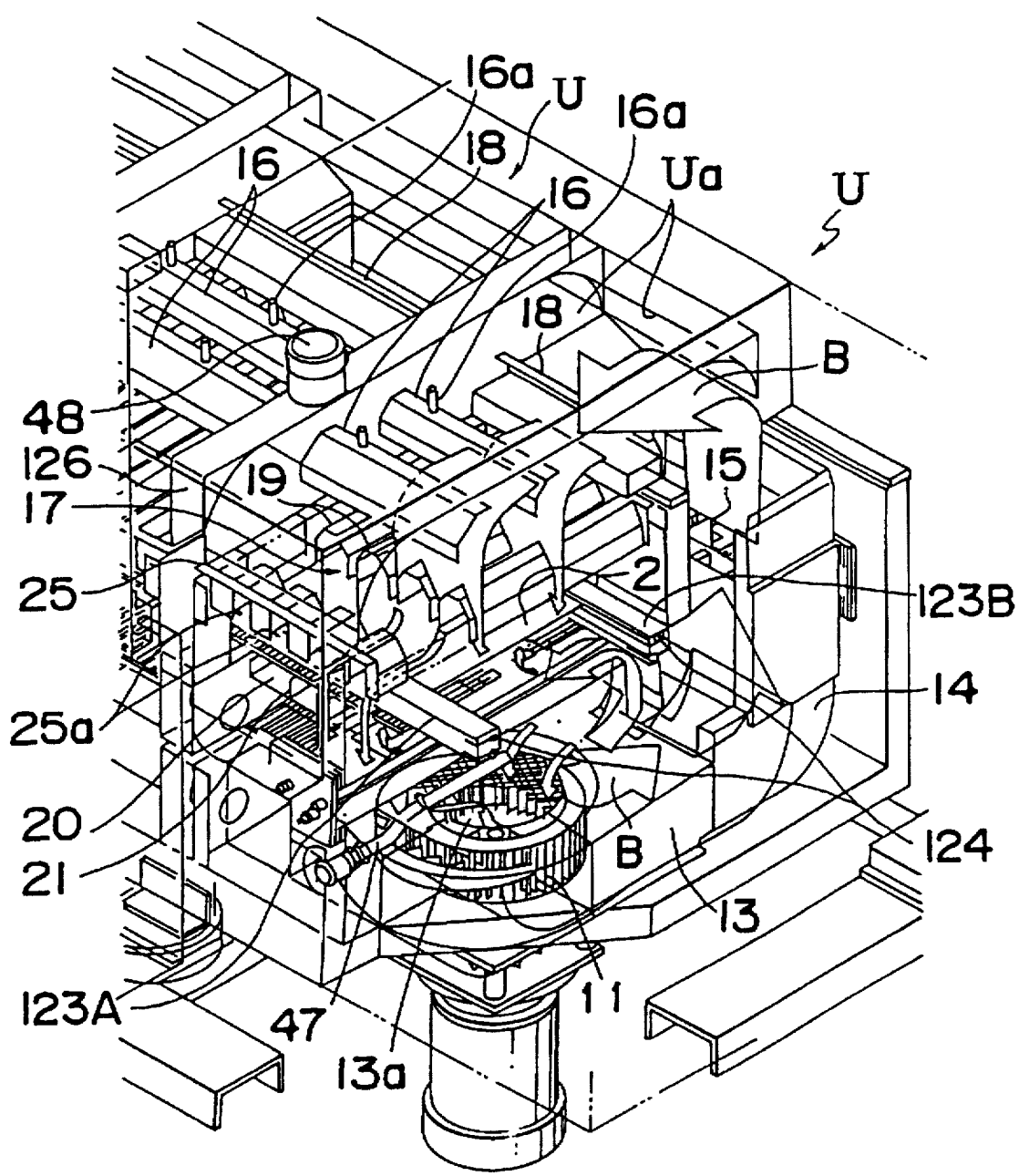
FIG. 1 is a partial perspective view of a heating unit of a reflow apparatus according to one embodiment of the present invention.

Before the description of the present invention proceeds, it is to be noted that like parts are designatedby like reference numerals throughout the accompanying drawings.

A preferred embodiment of the present invention will be described with reference to the accompanying drawings hereinbelow.

Figure 2:
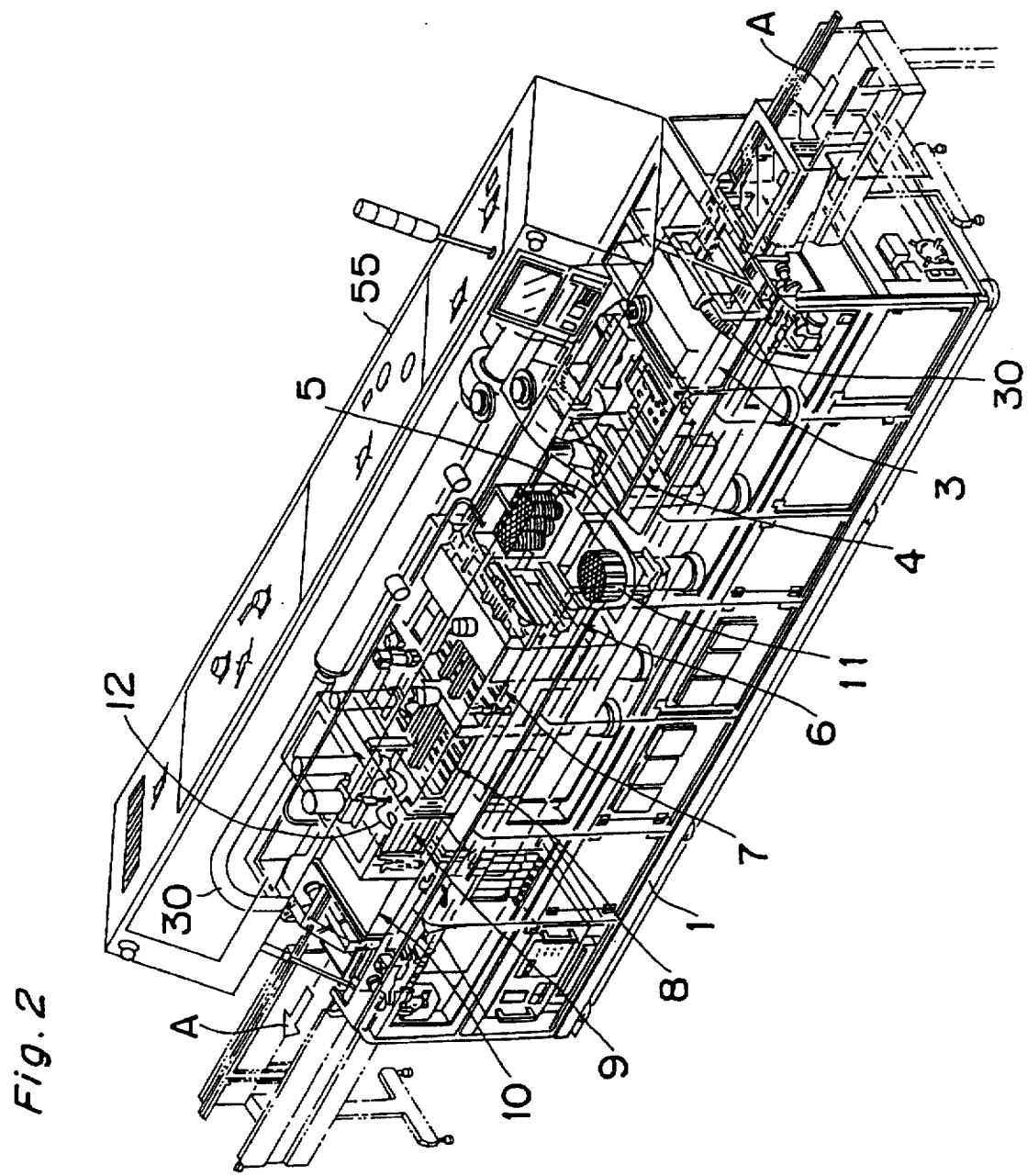
FIG. 2 is a perspective view of the total reflow apparatus when a lid is opened.

As indicated in FIG. 2, there are arranged within a reflow furnace 1 along a transferring direction (A) of a transfer path for circuit boards 2 (with reference to FIG. 1): an entrance resistance section 3, a first preheating section 4, a second preheating section 5, a third preheating section 6, a first reflow section 7, a second reflow section 8, a cooling section 9, and an exit resistance section 10, as seen from the upstream side of the path.

Each section is formed in a unit and filled with nitrogen gas. The preheating sections 4, 5, 6 and reflow (or heating) sections 7, 8 are constituted by heating units (U) of a construction similar to that shown in FIG. 1. The internal gas flow is circulated inside the heating unit (U) by a sirocco fan 11 placed in the lower part of the heating unit (U) for circulating hot gas. At the same time, the internal gas flow is circulated in a cooling unit constituting the cooling section 9 by a propeller fan 12 which is arranged in the upper part of the cooling unit to circulate cold gas. For purposes of the following description, the front side of the apparatus is shown in the lower right portions of FIGS. 1 and 2.

Figure 3:
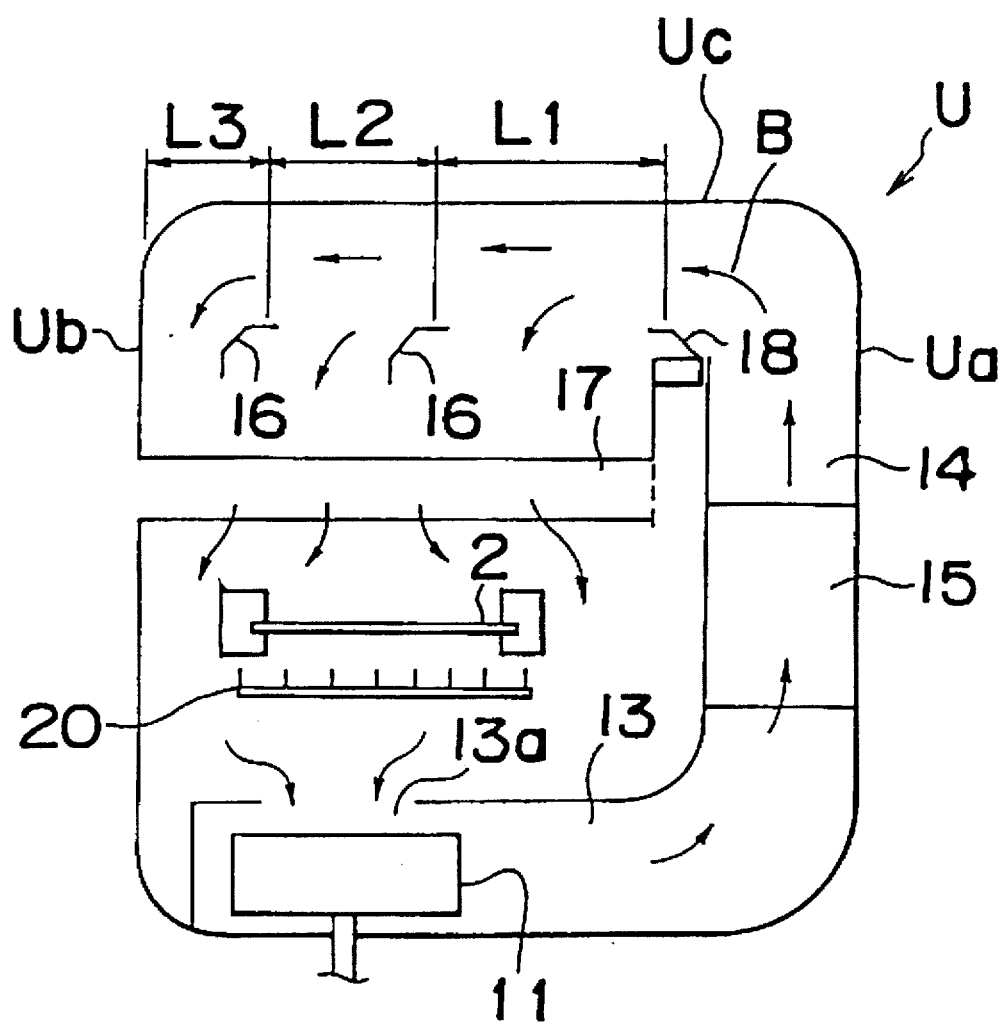
FIG. 3 is a schematic side sectional view showing a flow of gas in the heating unit of the reflow apparatus.

In each heating unit (U), as indicated in FIGS. 1 and 3, there are a lower path (or passageway) 13 extending rearwardly and a rear path (or passageway) 14 extending upwardly from behind the sirocco fan 11 in a box-shaped space defined by an inner wall surface (Ua) of the unit (U). A suction port 13a is formed in the lower path 13 above the sirocco fan 11. A heater 15 is provided in the rear path 14 to heat the circulating gas flow. At the same time, a plurality of straightening plates 16 and a blow-down nozzle 17 are placed in the upper part of the heating unit (U) so as to guide and blow out the gas flow heated by the heater 15 towards the transfer path. In other words, the inner wall surface (Ua) forming the box-shaped space and the lower path 13 and the rear path 14 defines a circulating gas path. In the circulating gas path, the gas flow (B) sent rearwardly through the lower path 13 from the sirocco fan 11 ascends along the rear path 14, is sent forwardly and, at the same time, falls down to be sucked by the sirocco fan 11 again.

Figure 13:
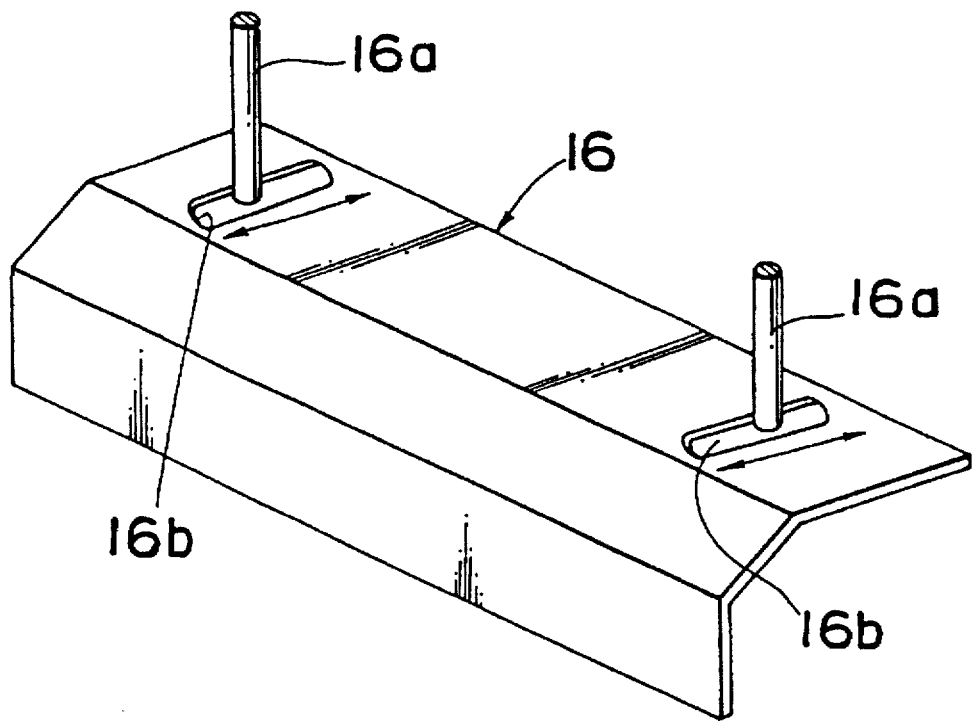
FIGS. 13 and 14 are a perspective view and a sectional view of sliding structure of a straightening plate.
Figure 14:
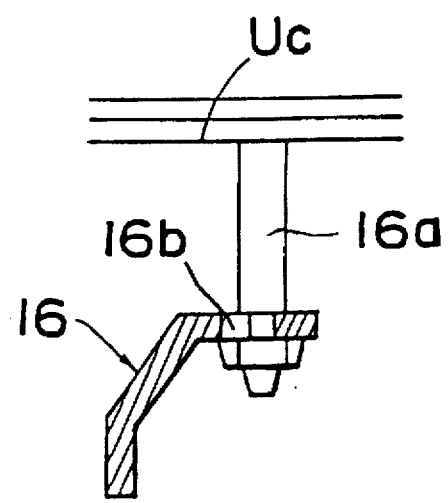

The straightening plates 16 extend forwardly approximately horizontally and are bent downwardly at the front parts thereof in cross section. The straightening plates 16 extend along the transferring direction (A) of the circuit boards. There are a plurality of the straightening plates 16 (two in the embodiment of FIG. 3) arranged in the backward-and-forward direction. As shown in FIGS. 13 and 14, projections 16a of each straightening plate 16 are fitted in elongated holes 16b formed in the upper surface part (Uc) of the inner wall surface (Ua) of the heating unit (U), so that the straightening plate 16 is supported so that it can be slid back and forth. In the embodiment, as shown in FIG. 3, the straightening plates 16 are arranged so that the distance (L1) between a guide plate 18 in the upper part closer to the rear side of the heating unit (U) and the rear straightening plate 16 is larger than the distance (L2) between the front and rear straightening plates 16 and, this distance (L2) is larger than the distance (L3) in the backward-and-forward direction between the front straightening plate 16 and a front surface part (Ub) of the inner wall surface (Ua). The inner wall surface (Ua) of the heating unit (U) stands beside the straightening plate 16 to separate and prevent the hot gas flow from moving to the adjacent section. The straightening plates 16 are set approximately at the same height and have the same cross section in the embodiment.

Figure 16:
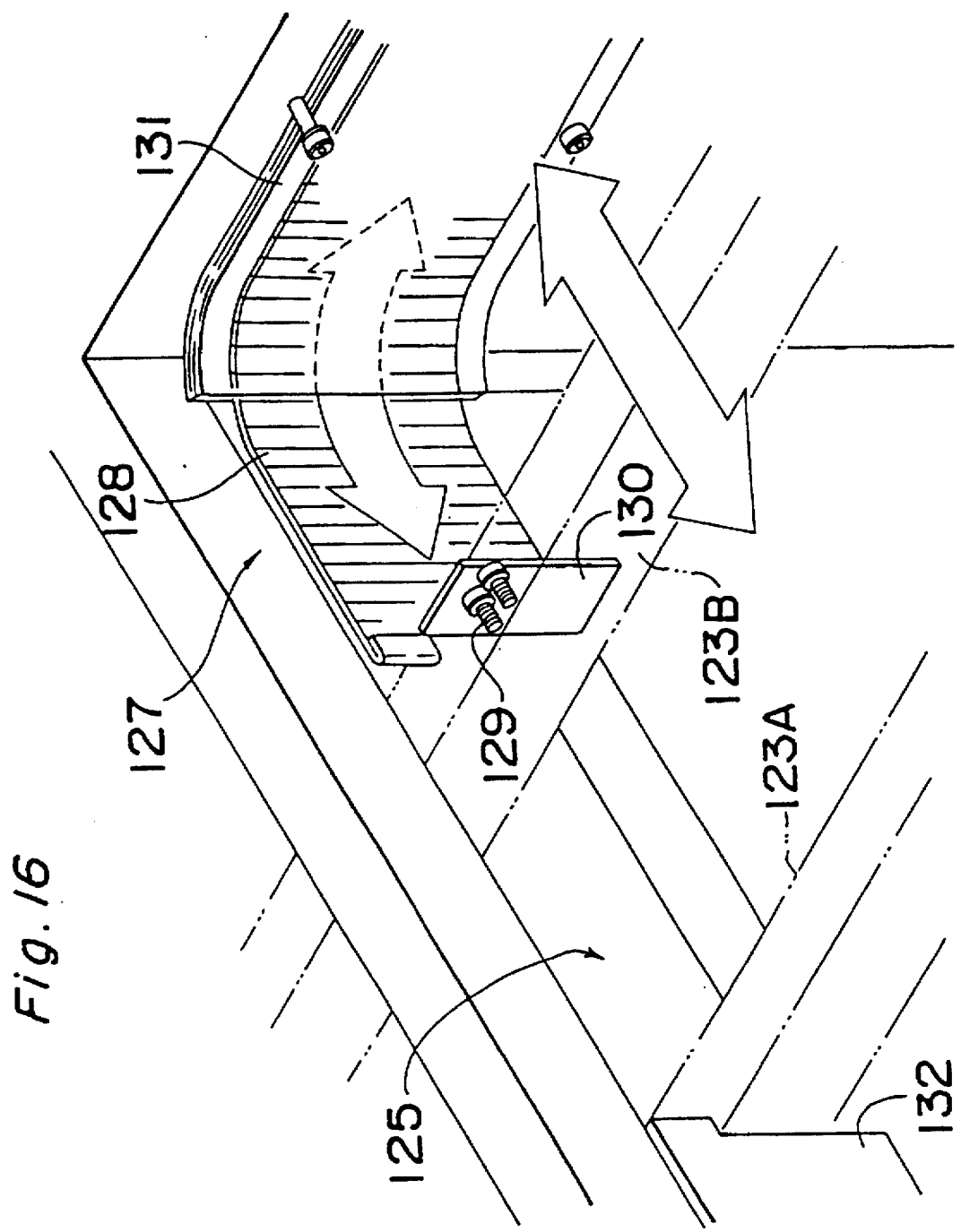
FIG. 16 is a perspective view of an opening at the boundary of sections of the reflow apparatus and the vicinity thereof.

Referring to FIGS. 1, 2, and 16, reference numerals 123A, 123B denote a pair of transfer guide rails constituting the transfer path, with chain conveyors 124 arranged thereinside. The transfer guide rail 123A at the front side is fixed at a predetermined position, while the transfer guide rail 123B at the rear side is made slidable in the lateral direction approximately orthogonal to the transferring direction (A), namely, in the widthwise direction of the transferred circuit board 2. Therefore, the transfer guide rails 123A and 123B are adapted to treat circuit boards 2 of various widths. An opening 125 is formed at the boundary of the sections. The transfer guide rails 123A and 123B extend through the opening 125.

The blow-down nozzle 17 is constituted by a plurality of bent plates 19 aligned in the transferring direction (A). Each plate 19 has an inverse U-shaped cross section and is extended in the backward-and-forward direction as is clearly understood from FIG. 1. Slit openings are formed between the adjacent bent plates 19. The blow-down nozzle 17 shoots out the hot gas flow of gas from above towards the transfer path at high speeds, and turns back the gas flow which is inclined to flow in parallel to the transferring direction (A). Notches 25a are formed in a supporting plate 25, which supports the front and rear ends of the plates 19, at positions corresponding to the inner surfaces of the bent plates 19.

Moreover, a hollow part 126 having a large sectional area along the transferring direction (A) and formed of a box-shaped frame 126a is provided between the sections. The gas flow (C) running from one section to the adjacent section enters the hollow part 126.

As is clearly shown in FIG. 16, the rear transfer guide rail 123B which is slidable in the widthwise direction of the circuit board 2 is provided with a shutter mechanism 127. The shutter mechanism 127 is comprised of a main body 128 having plate strips coupled to one another in the lateral direction in a bendable fashion, a mounting part 130 secured at the end of the main body 128 to the transfer guide rail 123B via bolts 129, and a case frame 131 located at the rear surface of each section for accommodating the main body 128. A fixed shutter plate 132 is set closer to the front side of the apparatus than the opening 125.

Figure 15:
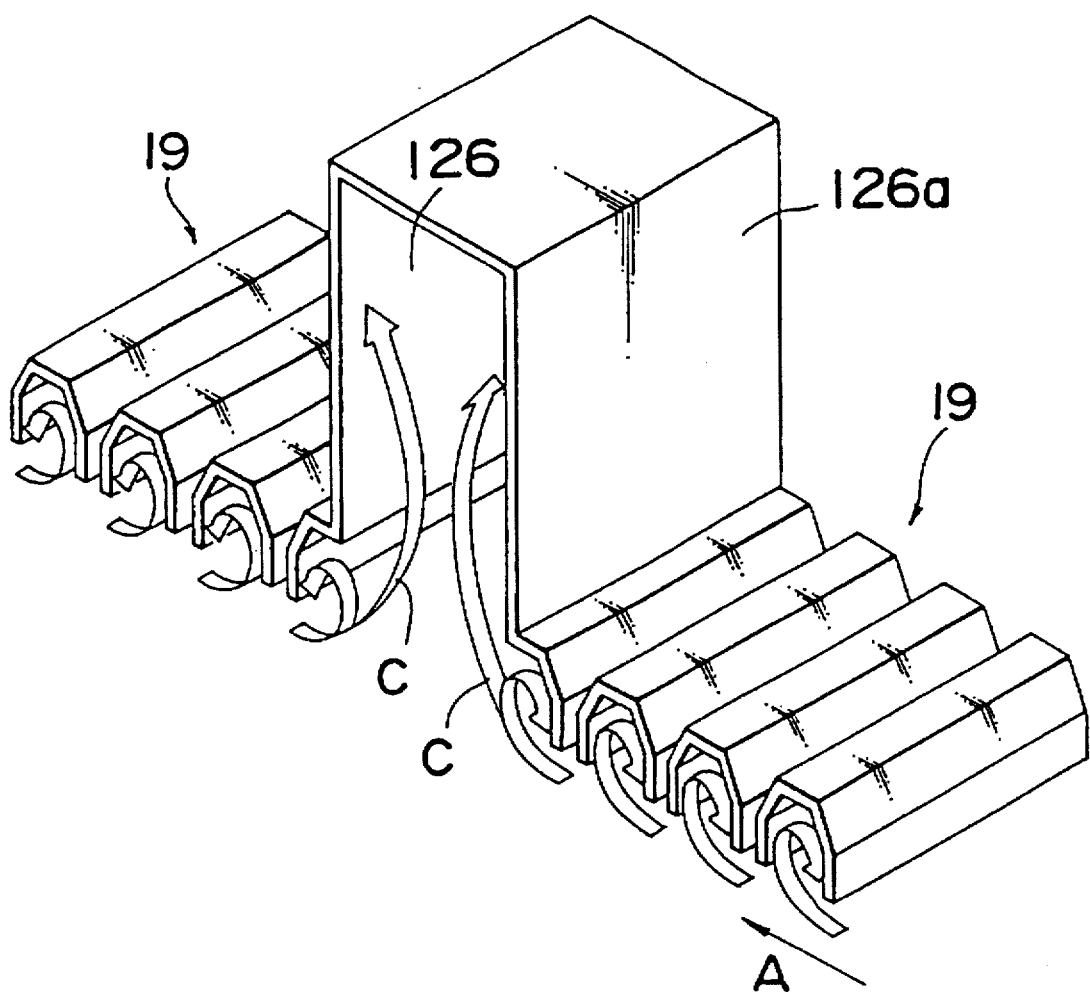
FIG. 15 is a perspective view of a hollow part of the reflow apparatus and the vicinity thereof.

In the above-described structure, as shown in FIG. 15, while the amount of the gas flow (C) flowing along the transfer path is reduced by the lower surface of the blow-down nozzle 17, the gas flow enters the hollow part 126 through the opening 125 at the boundary of the sections. At this time, since the hollow part 126 has a large sectional area, the pressure is lost because of the sudden increase of the sectional area along the path, and consequently the speed of the gas flow (C) from the section is decreased by the hollow part 126. As a result, the amount of the gas flowing between the adjacent sections is minimized, so that the low concentration of oxygen and the appropriate temperature in each section can be maintained stably.

Further, as shown in FIG. 16, since the unnecessary part of the opening 125 for the circuit board 2 at the boundary of the sections is closed by the shutter mechanism 127, the area of the opening 125 is limited to the necessary minimum, thereby stably securing the low concentration of oxygen and proper temperature in each section.

In the above embodiment, the shutter mechanism 127 is installed in the case where only one transfer guide rail 123B is made movable in the widthwise direction of the circuit boards. However, the shutter mechanism 127 can be also easily installed for each of the pair of the transfer guide rails 123A and 123B when both of the transfer guide rails are movable. Moreover, rather than the shutter mechanism 127 being mounted to the transfer guide rail, a mechanism to press the shutter mechanism 127 to the transfer guide rail can be provided to move the shutter mechanism 127 integrally with the transfer guide rail. Needless to say, the present invention is applicable to a reflow apparatus using inert gases, e.g., argon gas or the like, other than nitrogen gas.

According to the present invention as described hereinabove, since the hollow part is provided between the adjacent sections to obtain the pressure loss from the sudden increase of the sectional area of the path, the speed of the gas flow from the section can be decreased by the hollow part, and the amount of the gas flow entering and coming out of the adjacent section can be minimized, whereby the low concentration of oxygen and the proper temperature in each section can be ensured stably.

In addition, at least one of the pair of the transfer guide rails is made movable in the lateral direction orthogonal to the transfer path, and the shutter mechanism is provided which moves along with the movable transfer guide rail to thereby shut the part of the opening at the boundary between sections other than along the transfer path. Accordingly, the area of the opening between the adjacent sections is minimized, and the amount of the gas flow entering and coming out of the adjacent section is minimized by this arrangement, whereby the low concentration of oxygen and the proper temperature in each section can be secured stably.

A pseudo board plate 20 is placed in parallel with the transferring surface of the circuit board 2 below the transfer path in each heating unit (U) of the preheating sections 4, 5, 6, as is clearly seen in FIGS. 1 and 18. The pseudo board plate 20 is approximately the same width as the maximum width of the circuit board 2, and has a plurality of upwardly projecting plate-like parts 21 on the upper surface thereof at predetermined intervals along the transferring direction (A) of the circuit boards 2. The plate like parts extend in the lateral direction approximately orthogonal to the transferring direction (A) of the circuit boards 2 (in the widthwise direction of the circuit board 2).

Figure 19:
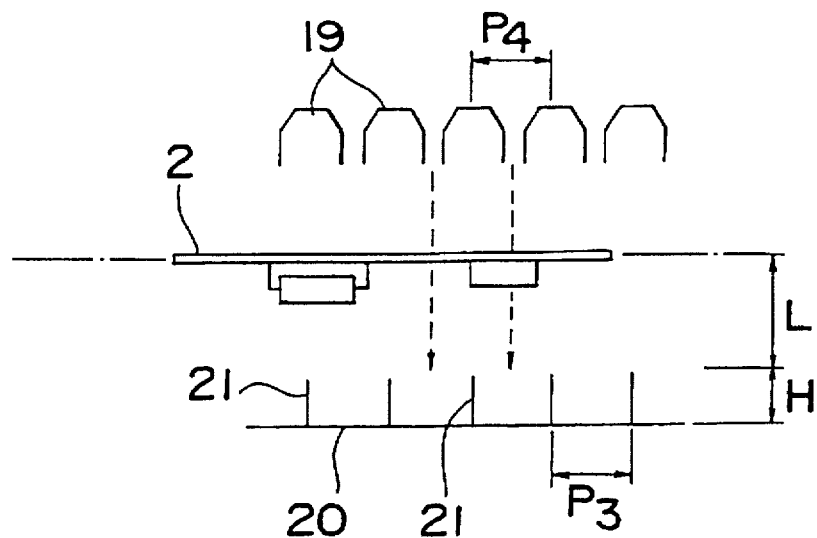
FIG. 19 is a front view schematically showing the vicinity of a transfer path of the reflow apparatus.

As is shown in FIG. 19, the pseudo board plate 20 is separated from the upper ends of the plate-like parts 21 by a distance (L) corresponding to the mounting space of components at the lower surface of the circuit board 2. At the same time, the pitch $P_3$ between the plate-like parts 21 is shifted half a pitch from the pitch $P_4$ between the bent plates 19 of the blow-down nozzles 17, so that the gas flow jetted downwardly from the slits between the bent plates 19 can be guided to the intervals between the plate-like parts 21. The height of the plate-like parts 21 is set to be about 20 mm in the embodiment.

Moreover, a blow-down nozzle (not shown) is provided in the heating unit (U) of each of the reflow sections 7, 8 to heat the lower surface of the transferred circuit board 2, without the pseudo board plate 20 being provided.

Figure 18:
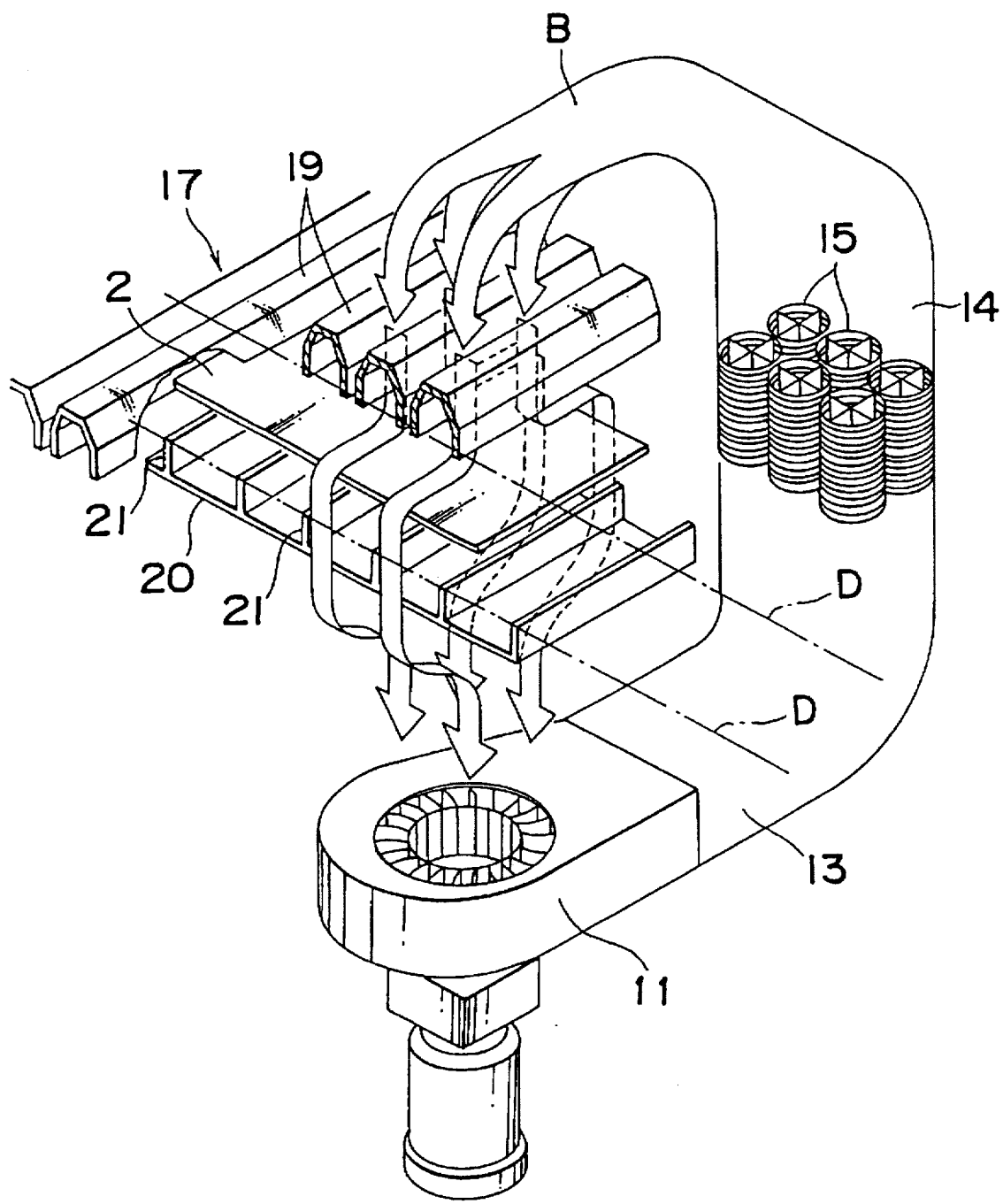
FIG. 18 is a perspective view of a part of the reflow apparatus.
Figure 20:
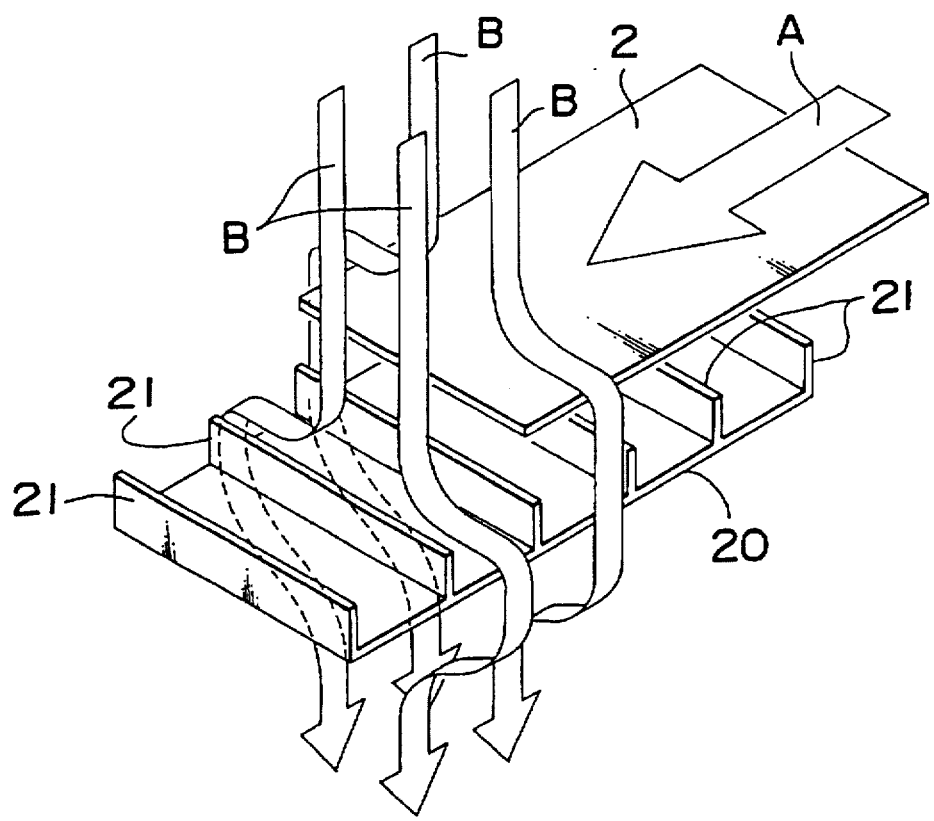
FIG. 20 is a perspective view of a part for use in explaining the operation of the reflow apparatus.

In the above-described structure, as shown in FIGS. 18 and 20, the gas flow (B) hits the circuit board 2 and the pseudo board plate 20 when the circuit board 2 is on the transfer path (D), and in consequence the gas flow (B) is diverged in the widthwise direction of the circuit board 2 to run along the circuit board 2 and about the rear and front surfaces of the pseudo board plate 20. Even when the circuit board 2 is not present in the transfer path (D), the gas flow (B) runs along the pseudo board plate 20 and about the rear and front surfaces thereof. Accordingly, irrespective of the presence/absence of the circuit board 2, the running direction of the gas flow (B) can be made constant.

Because of the standing plate-like parts 21 extended in the lateral direction approximately orthogonal to the transferring direction (A) of the circuit boards 2, the gas flow (B) is guided positively in the lateral direction approximately orthogonal to the transferring direction (A) of the circuit boards 2 (widthwise direction of the circuit board 2), whereby the flow towards the transferring direction (A), namely, the flow of the gas between the units or through the opening to the outside can be minimized.

Figure 22:
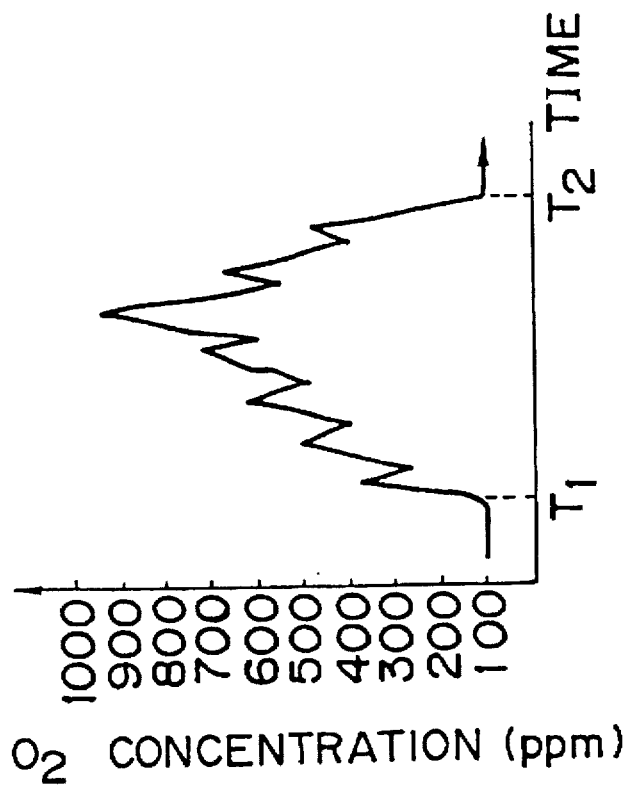
FIG. 22 is a diagram of the concentration of oxygen when the circuit board is transferred in a conventional reflow apparatus without having a pseudo board plate.
Figure 21:
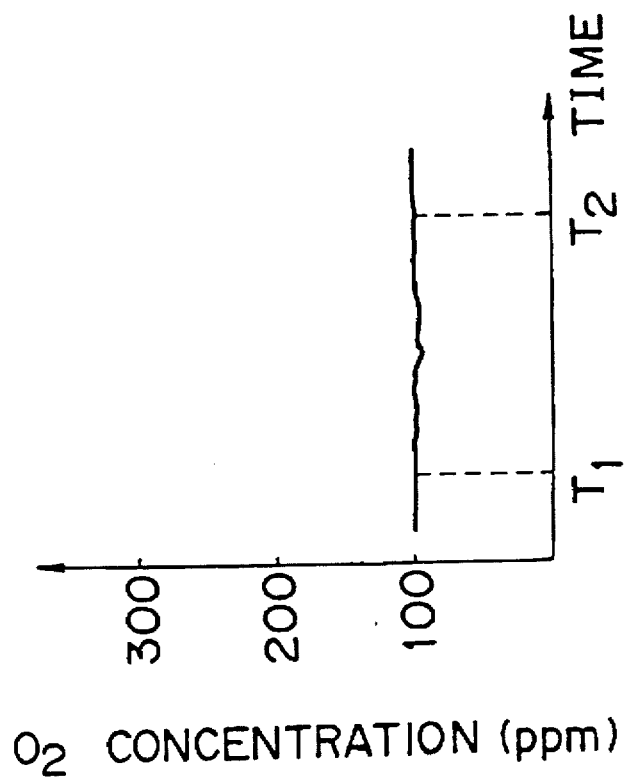
FIG. 21 is a diagram of the concentration of oxygen when a circuit board is transferred through the reflow apparatus.

Accordingly, since the direction of the gas flow (B) is made constant and the flow of the gas between the units or between the unit and the outside can be minimized, the low concentration of oxygen and the atmosphere of the optimum temperature can be stably secured. FIGS. 21 and 22 indicate comparative examples, in which (T1) is the time when the circuit board 2 is carried into the apparatus and (T2) is the time when the circuit board 2 is moved out of the apparatus. In the case where the pseudo board plate 20 is not provided, as is apparent from FIG. 22, the concentration of oxygen increases to 1000 ppm after the circuit board 2 is carried into the apparatus although the concentration of oxygen is 100 ppm at the time (T1) when the circuit board 2 is carried in. On the other hand, when the pseudo board plate 20 is provided, the concentration of oxygen is maintained at 100 ppm even after the circuit board 2 is carried into the apparatus, as is shown in FIG. 21.

Figure 23:
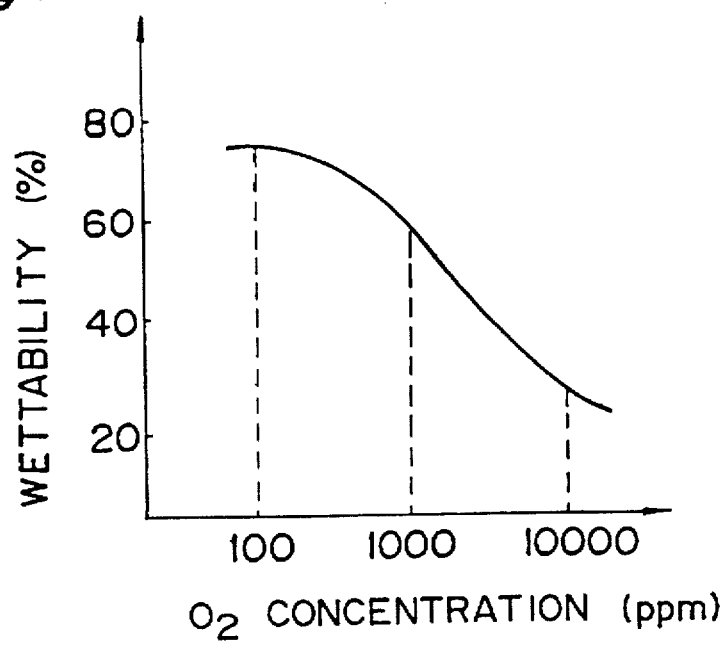
FIG. 23 is a diagram of the correlation between the concentration of oxygen and the wettability of solder.
Figure 25:
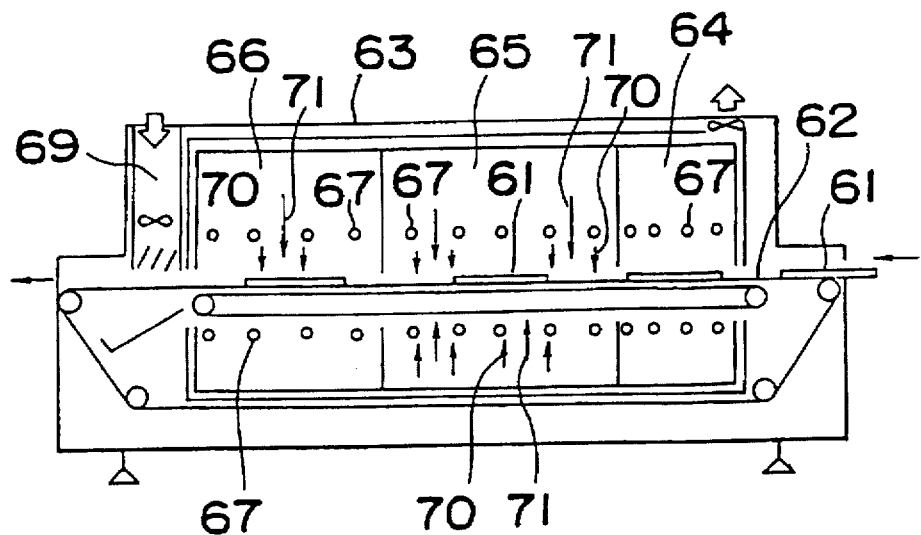
FIG. 25 is a sectional view of a conventional reflow apparatus.

FIG. 23 is a graph showing the wettability related to the concentration of oxygen. As indicated in FIG. 23, the wettability is best when the concentration of oxygen is about 100 ppm. As the concentration of oxygen is increased, the wettability is decreased. In other words, as the concentration of oxygen is kept favorably at 100 ppm or so, the generation of inferior parts caused by the solder bridge or the generation of solder balls which were brought about due to the deterioration of the wettability in the prior art can be largely prevented.

Figure 24:
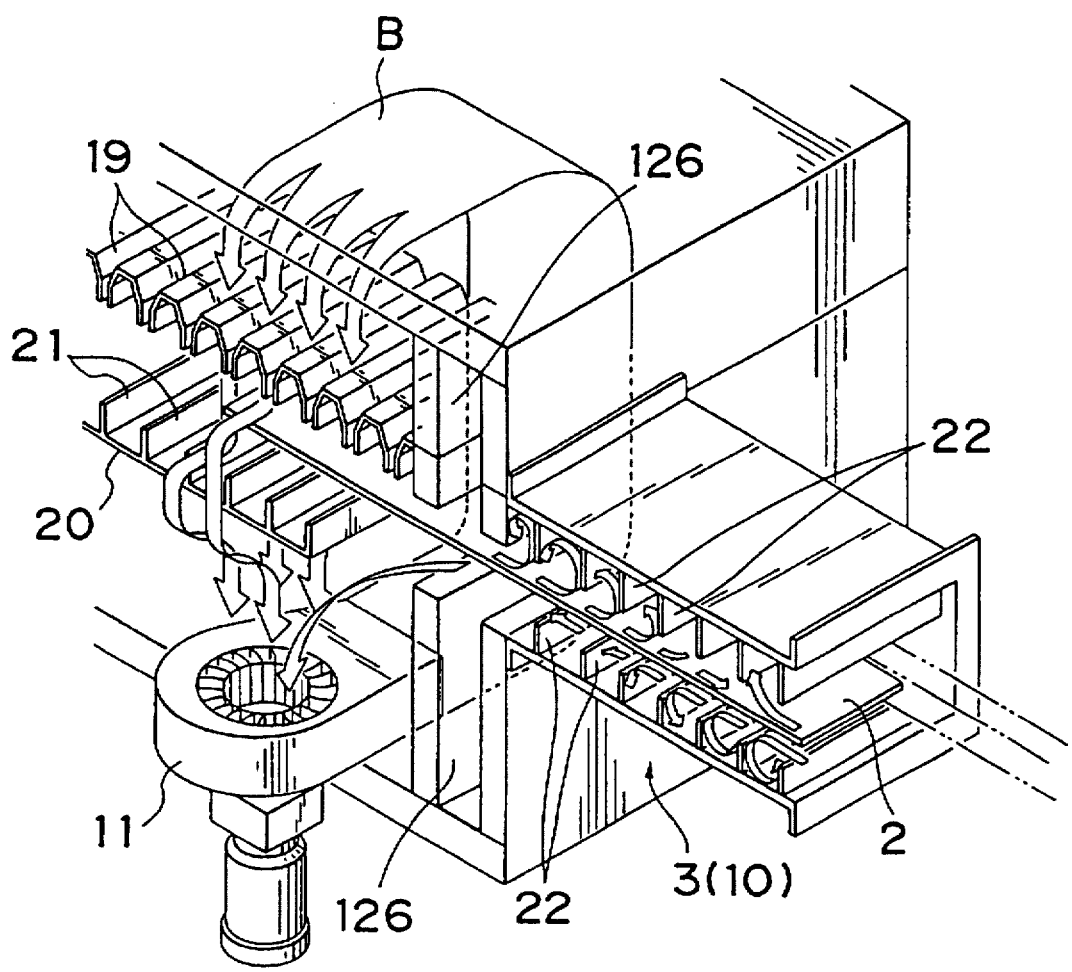
FIG. 24 is a perspective view of the heating unit and a resistance section of the reflow apparatus.

As shown in FIG. 24, a plurality of plate-like parts 22 are provided also at the entrance and exit resistance sections 3, 10. The plate-like parts 22 are extended in the lateral direction approximately orthogonal to the transferring direction (A) of the circuit boards 2 above and below the transfer path (D). Therefore, the gas is prohibited from flowing out from the inside of the reflow furnace 1 and the gas is prevented from entering from outside by the plate-like parts 22.

According to the present invention as described hereinabove, since the pseudo board plate is arranged parallel to the transferring surface of the circuit board to guide the gas flow running towards the transfer path in a fixed direction, the running direction of the gas flow can be made constant irrespective of the presence or absence of the circuit board, and accordingly, the low concentration of oxygen and the atmosphere of the optimum temperature can be stably secured.

Moreover, the pseudo board plate is provided with upwardly projecting plate-like parts extending in the lateral direction approximately orthogonal to the transferring direction of the circuit board. Accordingly, the gas flow between the sections and between the sections and the outside can be minimized, thus further positively ensuring the state of the low concentration of oxygen and the optimum temperature.

Meanwhile, a plurality of measures are taken to remove flux in the reflow furnace 1.

Figure 4:
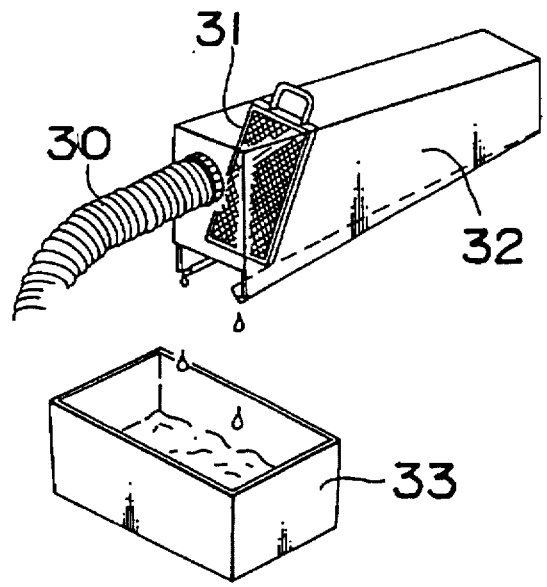
FIG. 4 is a perspective view of structure to remove flux at an entrance and an exit of the reflow apparatus.
Figure 5:
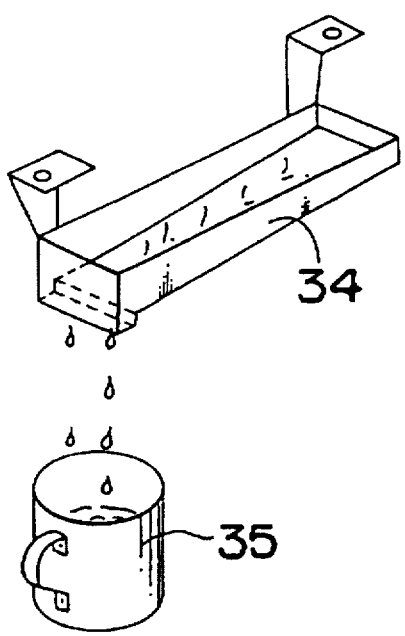
FIG. 5 is a perspective view of structure to remove flux at the entrance of the reflow apparatus.

First, an arrangement is designed where the circuit board 2 is carried in and out so that the air entering along with the circuit board 2 is discharged outside through an exhaust duct 30 shown in FIGS. 2 and 4. A metal mesh 31 is provided at a suction port of the exhaust duct 30. The flux dropping from the inclined lower surface of a frame body 32 with the metal mesh 31 is received by a pan 33. At the same time, another frame body 34 shown in FIG. 5 is provided below an entrance tunnel which is an entrance to the reflow furnace 1 to collect the flux falling from the circuit board 2. The dropping flux from the frame body 34 is received by a container 35.

Figure 6:
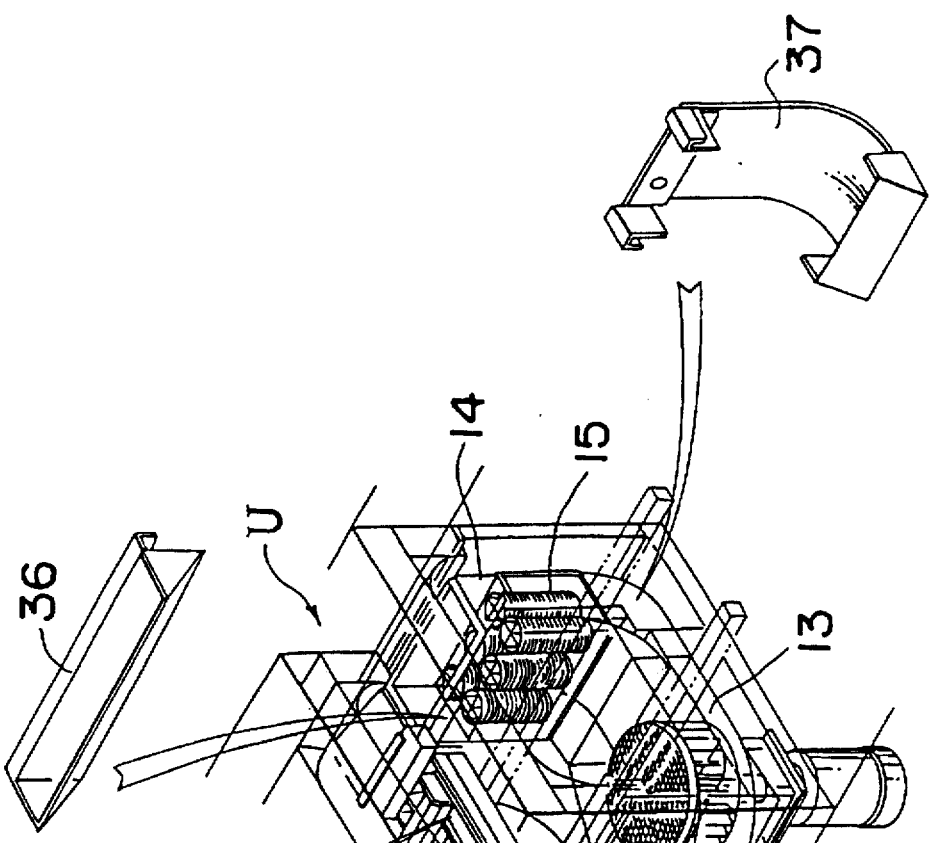
FIG. 6 is an exploded perspective view of structure to remove flux in the heating unit of the reflow apparatus.
Figure 7:
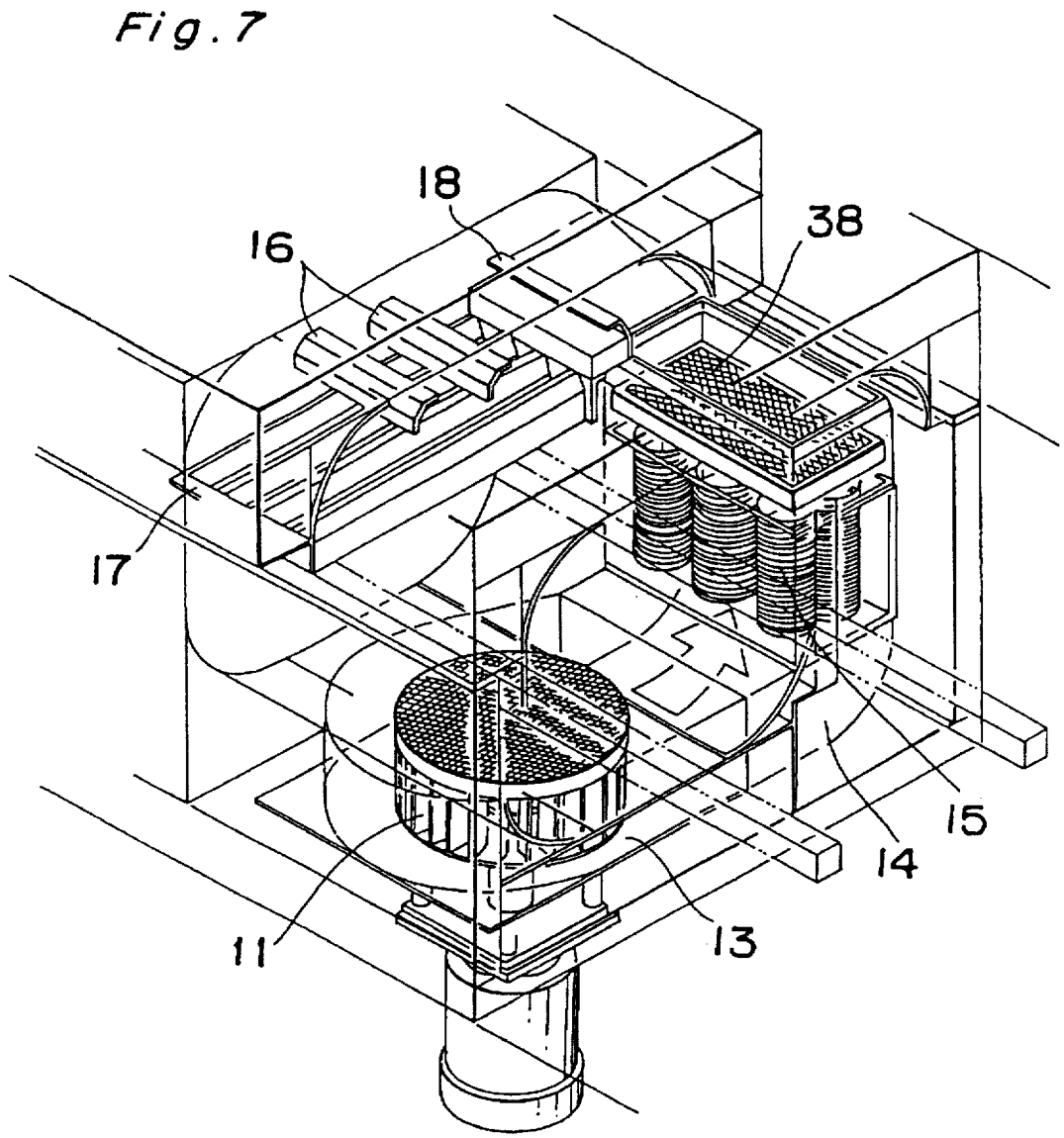
FIG. 7 is a perspective view of structure to remove flux in a cooling section of the reflow apparatus.

As indicated in FIG. 6, there is provided a wall receiver 36 at the wall surface in front of the upper edge of the rear path 14, etc. in each heating unit (U) so as to remove the flux solidified at the wall surface within the reflow furnace 1. Moreover, a receiver 37 is placed below the heater 15. If necessary, a catalyst 38 can be provided above the heater 15, as shown in FIG. 7, to reduce the flux.

Figure 17:
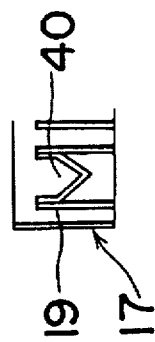
FIG. 17 is an enlarged view of a flux reservoir shown in FIG. 6.

Further, as in FIGS. 6 and 17, metal meshes 39 for removing the flux are arranged respectively in front of and behind the pseudo board plate 20, and a flux reservoir 40 is formed in the upper part of each bent plate 19 of the blow-down nozzle 17 in the third preheating section 6.

Figure 8:
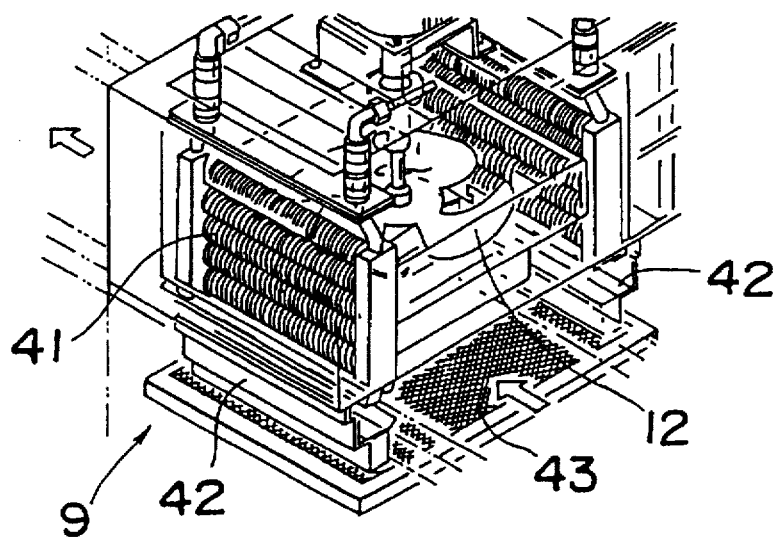
FIG. 8 is a perspective view of structure to remove flux in the cooling section of the reflow apparatus.

In FIG. 8, a pan 42 is provided below a cooling fin 41 of the cooling section 9 to receive the flux dropping out from the cooling fin 41. Also a filter of metal mesh 43 below the cooling section 9 removes the flux.

Figure 9:
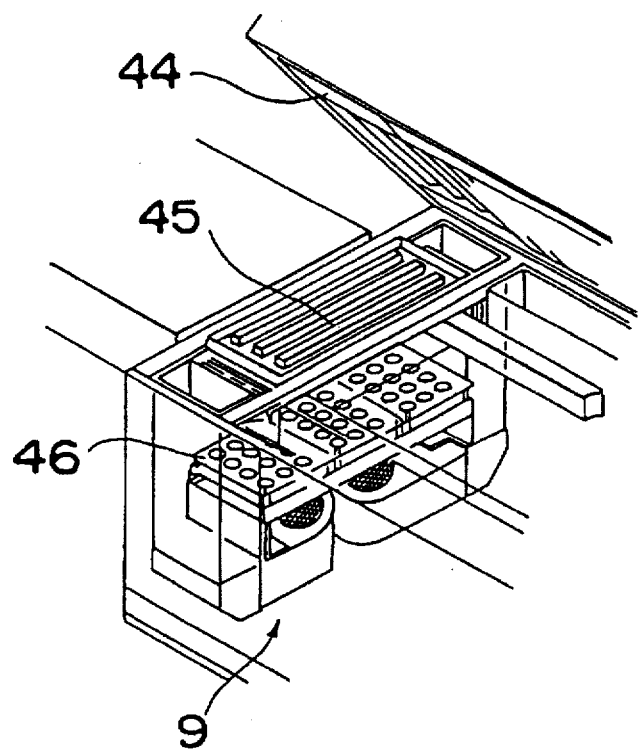
FIG. 9 is a perspective view of structure to remove flux in the cooling section of the reflow apparatus.

As shown in FIG. 9, a cooling fin 44 can be disposed above the cooling section 9, with a pan 45 and a double-layer filter 46 therebelow. The filter 46 can be formed of three or more layers.

Figure 10:
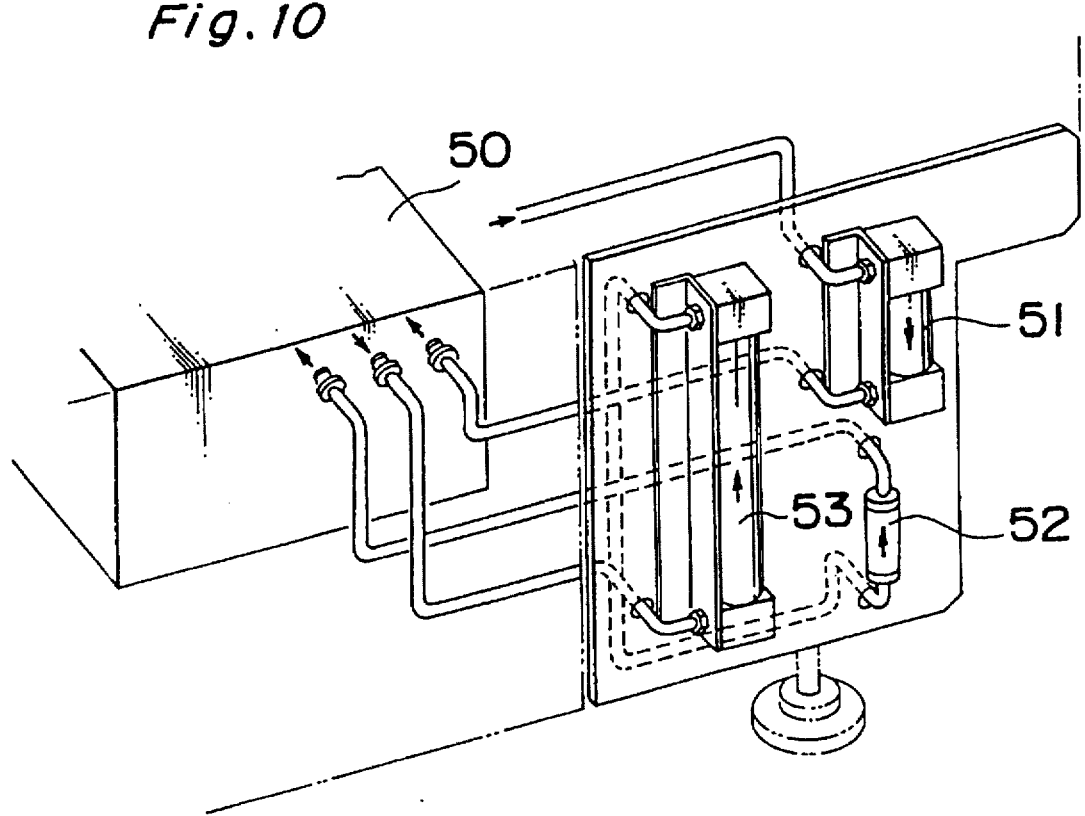
FIG. 10 is a perspective view of structure to remove flux of a gas suction section of the reflow apparatus.

In the reflow furnace 1, a temperature sensor and a gas suction port (not shown) are provided in each of the first preheating section 4, second preheating section 5, third preheating section 6, first reflow section 7, second reflow section 8, and cooling section 9. After the flux is removed from the gas drawn through the suction port by a wool-glass filter 51, a mesh filter 52, and an activated carbon filter 53, etc. as shown in FIG. 10, the concentration of oxygen is measured by an oxygen concentration analyzer 50. The state and temperature of the hot gas flow in the reflow furnace 1 are controlled based on the data of the temperature and oxygen concentration of each section, to thereby feedback and control the oxygen concentration and temperature of each section within a predetermined range. In the present reflow furnace 1, the oxygen concentration of the preheating sections 4, 5, and 6 is controlled to be approximately 400 ppm, and that of the reflow sections 7 and 8 is controlled to be about 100 ppm. A predetermined amount of nitrogen gas is mixed with a predetermined amount of air through feedback control of the feeding amount thereof, and then the mixed gas is supplied to the reflow furnace 1 by 200 l per min.

Referring to FIG. 1, reference numeral 47 is an injection nozzle for nitrogen gas mixed with air to blow gas with a low concentration of oxygen, and reference numeral 48 indicates an exhaust duct. The mixed gas is injected at all times or at the time of reflow and, exhausted when the reflow is finished, etc. Moreover, reference numeral 55 in FIG. 2 shows a lid body to cover the upper surface of each unit.

In the above-described constitution, as shown in FIGS. 1 and 3, the hot gas flow (B) from the rear path 14 is moved forward as shown in FIG. 1 along the upper surface (Uc) of the inner wall surface (Ua). During this movement, while the hot gas flow is dispersed in the forward-and-backward direction of the straightening plates 16, the gas flow descends downward. Since the distance (L1) between the guide plate 18 set in the upper part closer to the rear side of the heating unit (U) and the rear straightening plate 16 is larger than the distance (L2) between the front and rear straightening plates 16, and moreover, the distance (L2) is larger than the distance (L3) between the front straightening plate 16 and the front surface part (Ub) of the inner wall surface (Ua), the horizontal surface where the gas flow falls at the straightening plates 16 is divided into smaller areas towards the front side by the straightening plates 16. Therefore, although the gas flow would descend more at the front side due to inertia if not for the presence of the straightening plates 16, the hot gas flow is actually uniformly dispersed in the backward-and-forward direction owing to the presence of the straightening plates 16. Moreover, the hot gas flow is dispersed in the transferring direction (A) as well by the blow-down nozzle 17 and jetted out towards the circuit board 2 on the transfer path. Accordingly, the hot gas flow of uniform velocity can be jetted to the whole surface of the circuit board 2 in the vertical direction, thus achieving favorable preheating and reflow.

Since the circulating gas path is formed in each unit to move the hot gas flow upward fully from the rear side and to drop from the front side, the gas flows (B) are stirred when passing through the circulating path, so that the temperature and velocity of the gas flows are made uniform. Accordingly, the circuit board 2 moving along the transfer path can be properly heated by the gas flows having the uniform temperature and velocity. Moreover, since the gas flows are jetted toward the circuit board 2 in the vertical direction by the straightening plates 16 and blow-down nozzle 17, the gas flows in the transferring direction (A) can be minimized and the direction of the internal gas flow can be made constant. The low concentration of oxygen and the optimum atmospheric temperature can be secured in each unit or each section. Moreover, even when the hot gas flow blown toward the circuit board 2 is reflected to hit the rear surface of the bent plates 19 of the blow-down nozzle 17, the reflected flow is discharged out through the notched parts 25a of the bracket plates 25 in front of and behind the plates 19. Therefore, the hot gas flow is prevented from remaining at the rear surface side of the blow-down nozzle 17.

Figure 11:
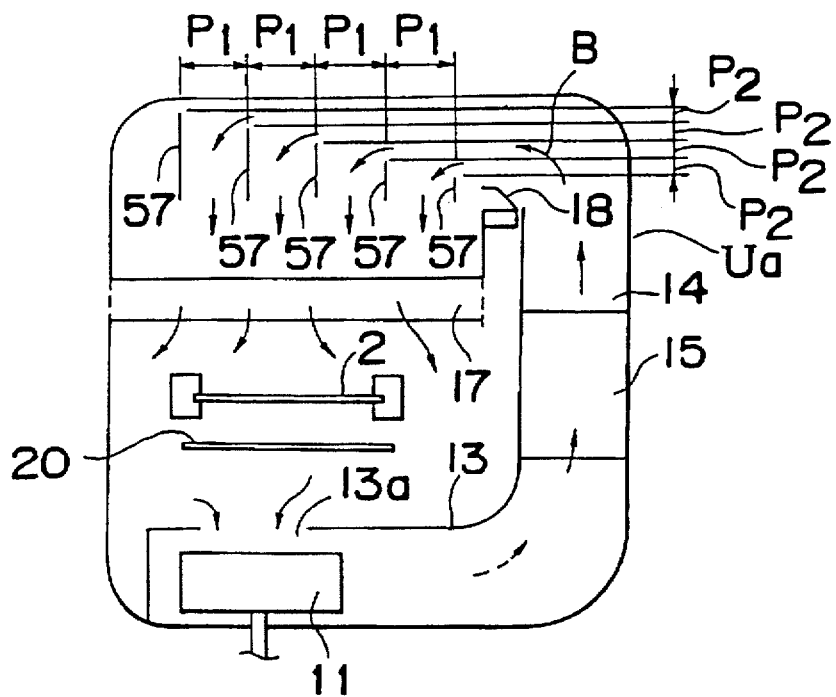
FIG. 11 is a schematic side sectional view of a heating unit of a reflow apparatus according to a further embodiment of the present invention.

FIG. 11 shows a modification of the embodiment of the present invention. In the modification of FIG. 11, a straightening plate 57 is formed of a plate extending only in the vertical direction. A plurality of straightening plates 57 are arranged at predetermined intervals ($P_1$) in the forward-and-backward direction. The straightening plates 57 are so arranged that one disposed downstream (with respect to the flow B) in the lateral direction of the hot gas flow, namely, at the front side has its upper end extended higher by the distance ($P_2$) than the rear straightening plate 57.

Because of such arrangement of the straightening plates 57 as discussed above, the hot gas flow inclined to run from the upstream part of the rear path 14 to the front side is dispersed uniformly in the front-to-back direction when the hot gas flow is guided downward. Therefore, the hot gas flow of a uniform velocity is jetted toward the circuit board 2 moving along the transfer path, thereby realizing favorable preheating and reflow. It is to be noted that if the length of the straightening plates 57 is the same in the vertical direction, the straightening plates at the front side can be placed at higher positions such that the straightening plates are shifted only in the vertical direction.

Figure 12:
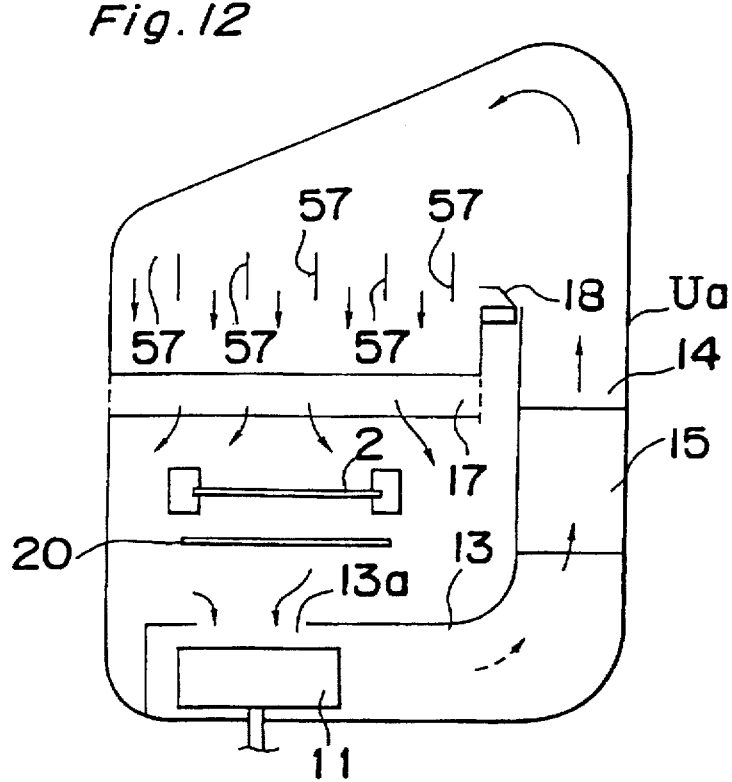
FIG. 12 is a schematic side sectional view of a heating unit of a reflow apparatus according to a further embodiment of the present invention.

FIG. 12 shows another modification of the embodiment. In this modification, the length of the straightening plates 57 is the same and the upper surface (Uc) of the inner wall surface (Ua) is inclined so that the distance between the upper surface (Uc) and the upper end of the rear straightening plate 57 is larger than the distance between the upper surface (Uc) and the upper end of the front straightening plate 57. As a result, the same operation and effects can be obtained as in the foregoing modification.

In the embodiment, nitrogen gas is used as the inert gas. It is needless to say that the present invention is easily applicable to a reflow furnace which jets another inert gas or which performs the reflow in air.

As described hereinabove, according to the present invention, the circulating gas path is formed to move the gas flow up at one side of the heating section and to down at the other side of the heating section. Therefore, even when the gas flows heated in different manners by the heating means are discharged, the gas flows are stirred along the circulating path, so that the temperature and velocity of the gas flows become uniform. The circuit board on the transfer path can be properly heated by the gas flows of the uniform temperature and velocity. Moreover, for example, the gas flows can be prevented from ascending from both sides and meeting at the center so as to disturb each other. Accordingly, the directions of the internal gas flow in the heating sections within the reflow furnace can be made constant, with the optimum atmospheric temperature secured.

Since a plurality of straightening plates are arranged above the transfer path to guide the hot gas flow running in the lateral direction down to the circuit board moving along the transfer path, the running direction of the internal gas flow, particularly, the running direction and running speed of the internal gas flow in the vicinity of the transfer path can be made constant, and the temperature and velocity of the gas flow hitting the circuit board can be made uniform. Further, as the straightening plates are slidable in the lateral direction orthogonal to the transferring direction of the circuit boards, the amount of the hot gas flow in the lateral direction orthogonal to the transferring direction can be adjusted easily. Since the distance between the adjacent straightening plates in the lateral direction orthogonal to the transferring direction of the circuit boards is arranged to be smaller than that between the straightening plate and the guide wall surface which guides the hot gas flow downwardly at the downstream side of the lateral running direction of the hot gas flow, the amount of the hot gas flow along the lateral direction orthogonal to the transferring direction can be made uniform.

Moreover, when a straightening plate disposed at the downstream end of the lateral running direction of the hot gas flow is arranged higher than those upstream thereof, it is possible to make the amount of the hot gas flow uniform, whereby the temperature and velocity of the hot gas flow jetted toward the circuit board can be uniform.

The blow-down nozzle is constituted of plates aligned in a plurality of rows at predetermined intervals in the transferring direction of circuit boards. Each plate has two edges bent downwardly in cross section. The blow-down nozzle is set below the straightening plates and the gas flow is blown toward the circuit board from slit openings formed between the plates of the blow-down nozzle. Therefore, the hot gas flow can be jetted toward the circuit board while the hot gas flow is favorably dispersed in the transferring direction. Since the notched part (notches) is formed to discharge the gas flow entering the rear side of the blow-down nozzle, the hot gas flow is prevented from stagnating at the rear side of the blow-down nozzle, thereby better ensuring the low concentration of oxygen and the optimum atmospheric temperature.

Since the gas flows from only one side of the fan as shown in FIG. 3, the efficiency is better than a case where the gas flows from both sides of the fan.

Although the present invention has been fully described in connection with the preferred embodiments thereof with reference to the accompanying drawings, it is to be noted that various changes and modifications are apparent to those skilled in the art. Such changes and modifications will be to be understood as included within the scope of the present invention as defined by the appended claims unless they depart therefrom.

What is claimed is:

1. A reflow apparatus in which hot gas flow is fed to a circuit board to solder the circuit board while the circuit board to which a cream solder has been supplied beforehand is carried into a plurality of sections within a reflow furnace along a transfer path in a transferring direction, the reflow apparatus comprising a heating section which comprises:

a fan for sending the gas flow;

a heating device for heating gas sent out from the fan, the heating device arranged at one side of the transfer path; and a circulating gas path, provided with a plurality of straightening plates arranged above the transfer path to form a plurality of openings, for collecting substantially all of the gas flow sent out from the fan, raising the collected gas flow along said one side of the transfer path through the heating device, forwarding the raised gas flow in a lateral direction orthogonal to the transferring direction, and dropping the forwarded gas flow down towards the circuit board on the transfer path from an upper side of the heating section.

2. The reflow apparatus as claimed in claim 1, wherein each of said straightening plate members is attached to an upper part of the heating section so as to be slidable in the lateral direction orthogonal to the transferring direction of the circuit boards.

3. The reflow apparatus as claimed in claim 1, wherein the straightening plate members are so arranged that a distance of the opening at a front side of the heating section in the lateral direction orthogonal to the transferring direction of the circuit boards is smaller than that of the opening at a rear side of the heating section so as to uniformly guide the gas flow downward.

4. The reflow apparatus as claimed in claim 1, wherein the straightening plate members have equal vertical lengths and are so arranged that distances between upper ends of the straightening plate members and an upper wall of the heating section gradually become smaller in the direction from a rear part to a front part of the heating section.

5. The reflow apparatus as claimed in claim 1, wherein an upper wall of the heating section is inclined from a rear side to a front side of the heating section so that distances between upper ends of the straightening plate members and an upper wall of the heating section gradually become smaller in the direction from a rear part to a front part of the heating section.

6. The reflow apparatus as claimed in claim 1, wherein a blow-down nozzle having a length equal to or greater than a length of the circuit board in the transferring direction of the circuit boards is formed of plate members each having both edges bent downward in cross section and aligned in a plurality of rows spaced at predetermined intervals in the transferring direction of the circuit boards, said blow-down nozzle being arranged below the straightening plate members, so that the gas flow is blown toward the circuit board through a slit opening formed between the plate members of the blow-down nozzle.

7. The reflow apparatus as claimed in claim 6, wherein the blow-down nozzle has a flux receiving member of M-shaped sectional structure at an upper portion thereof for removing flux from the gas flow.

8. The reflow apparatus as claimed in claim 1, further comprising a catalyst arranged at a downstream side of the heating device for removing flux from the gas flow.

9. The reflow apparatus as claimed in claim 1, wherein said circulating gas path includes a substantially horizontal portion above the transfer path, and said substantially horizontal portion serves to carry out said forwarding of the raised gas flow in the lateral direction orthogonal to the transferring direction by forwarding the gas flow in a substantially horizontal direction.

10. The reflow apparatus as claimed in claim 9, wherein said straightening plates are disposed in said substantially horizontal portion of said circulating gas path and serve to change the gas flow in said substantially horizontal portion from substantially horizontal gas flow to a substantially vertical gas flow.

11. A reflow method for feeding hot gas flow to a circuit board to solder the circuit board while the circuit board to which a cream solder has been supplied beforehand is carried into a plurality of sections within a reflow furnace along a transfer path, the method comprising, in a heating section:

sending the gas flow by a fan;

heating gas sent out from the fan by a heating device arranged at one side of the transfer path; and in a circulating gas path, collecting substantially all of the gas flow sent out from the fan, raising the collected gas flow along said one side of the transfer path through the heating device, forwarding the raised gas flow in a lateral direction orthogonal to the transferring direction, and dropping the forwarded gas flow towards the circuit board on the transfer path from an upper side of the heating section down through openings formed by straightening plates arranged above the transfer path.

12. The reflow method as claimed in claim 11, wherein said forwarding of the raised gas flow in the lateral direction orthogonal to the transferring direction comprises forwarding the gas flow in a substantially horizontal direction.

13. The reflow method as claimed in claim 12, further comprising in order to drop the forwarded gas flow towards the circuit board on the transfer path, changing a direction of the forwarded gas flow from the substantially horizontal direction to a substantially vertical direction by providing the straightening plates above the transfer path.

* * * * *